Figure 1:
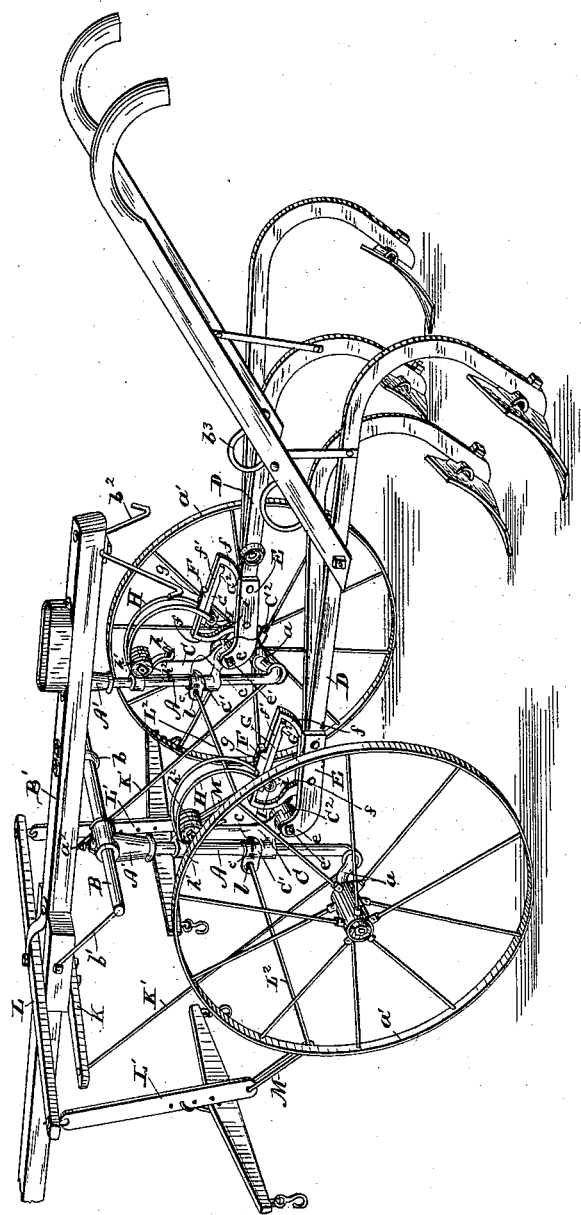

(No Model.) 2 Sheets—Sheet 1.

W. L. CASADAY.
WHEEL CULTIVATOR.

No. 381,985. Patented May 1, 1888.

Witnesses.
Chas. R. Burr.
Thomas Durant.

Inventor.
William L. Casaday
by Franck D. Johns.
Attorney.

(No Model.) 2 Sheets—Sheet 2.
W. L. CASADAY.
WHEEL CULTIVATOR.
No. 381,985. Patented May 1, 1888.
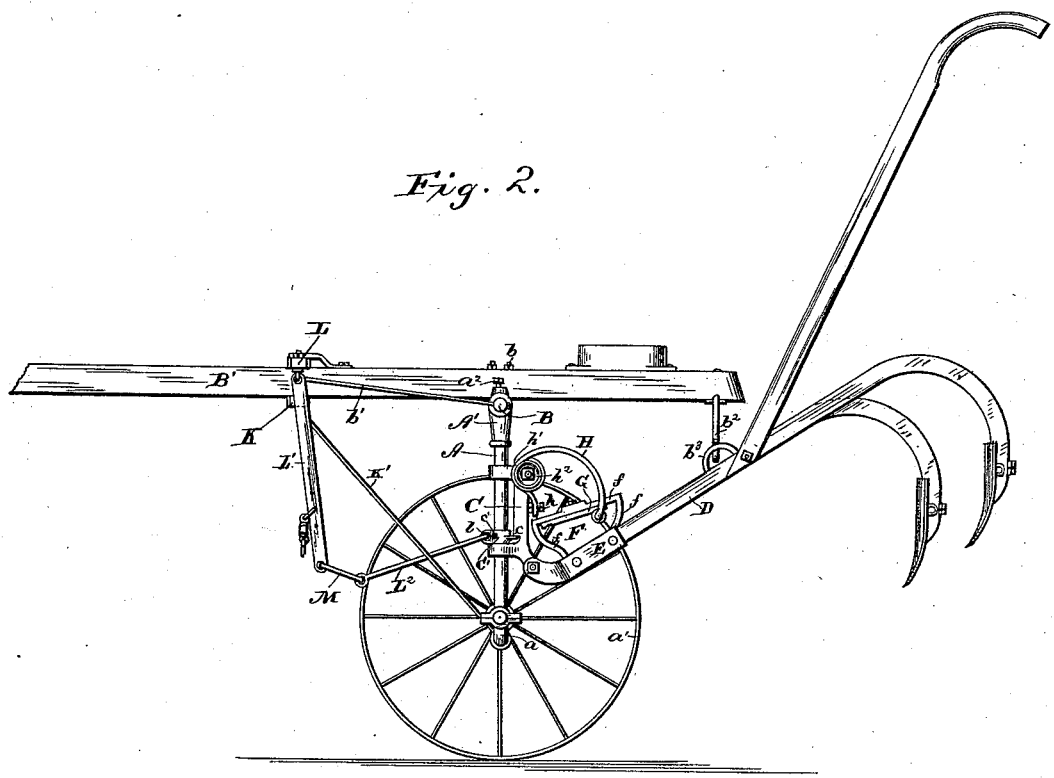
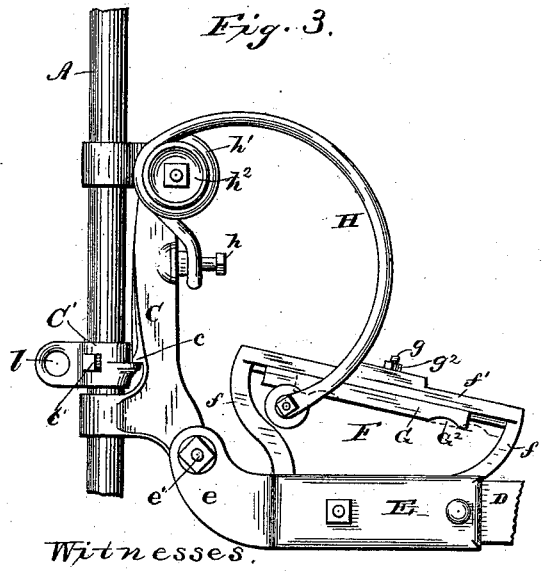
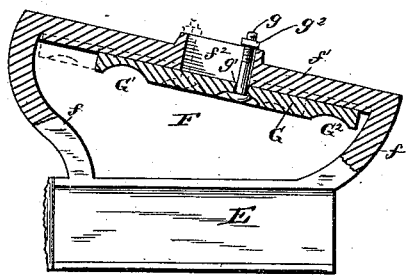
Witnesses
Chas. R. Burr.
Thomas Durant.
Inventor
William L. Casaday.
by Franck D. Johns.
Attorney.

UNITED STATES PATENT OFFICE.

WILLIAM L. CASADAY, OF SOUTH BEND, INDIANA.

WHEEL-CULTIVATOR.

SPECIFICATION forming part of Letters Patent No. 381,985, dated May 1, 1888.

Application filed September 19, 1887. Serial No. 250,082. (No model.)

*To all whom it may concern:*

Be it known that I, WILLIAM L. CASADAY, a citizen of the United States, residing at South Bend, in the county of St. Joseph and State of Indiana, have invented certain new and useful Improvements in Wheeled Cultivators; and I do hereby declare the following to be a full, clear, and exact description of the invention, such as will enable others skilled in the art to which it appertains to make and use the same.

My invention relates to improvements in that class of wheeled straddle-row cultivators which are known as "arched cultivators," and which are provided with vertically-swinging plow or cultivator beams, and springs which operate to balance said beams and hold them at the desired angle when adjusted in an operative position, and which also lift the beams when raised above an operative position and hold the same elevated.

My said invention consists in certain novel construction, arrangement, and combinations of parts, all of which I will now proceed to point out and describe, reference being had to the accompanying drawings, in which—

Figure 1 is a perspective of a cultivator embodying my invention. Fig. 2 is a side elevation showing the plow or cultivator beams elevated in an inoperative position. Figs. 3 and 4 are details showing various parts of my said invention.

Referring to said drawings, A A represent two round upright arms having their lower ends, $a\ a$, bent outward horizontally and forming the spindles for the carrying-wheels $a'\ a'$. To the upper ends of these arms are secured sleeve-couplings A' A', the openings in said couplings being round in cross-section, said couplings being mounted and adapted to be moved laterally on the opposite ends of the round cross-bar B. The cross-bar B is rigidly secured to the tongue B' by a staple, $b$, and braces $b'\ b'$, which hold said cross-bar at right angles to and horizontal with the tongue. The couplings A' A' can be adjusted at any desired point on the cross-bar, and are secured thereto by set-screws $a^2\ a^2$. The uprights A A and cross-bar B form the arch or frame of the cultivator. Said upright arms being adjustable to or from each other, the distance between the same can be changed, so as to change the distance between the plow or cultivator beams which are coupled to said arms, as hereinafter described. By means of the round cross-bar B and sleeve-couplings A' A' the tongue may be adjusted at any desired inclination.

On each upright arm A is loosely mounted a vertically-adjustable bracket, C, which is held at any desired point on the upright arm by a collar, C', which engages with a lug or projection, $c$, on the bracket. Said collar is provided with a set-screw, $c'$. This bracket, it will be seen, swings laterally on the upright arm. On the lower portion of the bracket is formed, integral therewith, a coupling-head, $C^2$, having a horizontal aperture arranged at right angles to the vertical line of the bracket.

D D represent the plow or cultivator beams provided with the usual handles and cultivator shovels or plows.

E are castings secured to the forward end of each beam. Said castings are provided with projecting ears or lugs $e\ e$, having eyes therein. These ears or lugs engage with the opposite ends of the coupling-heads $C^2$, and are secured thereto by bolts $e'\ e'$, passing through the apertures in the coupling-heads and eyes in the ears or lugs, thus pivotally securing the beams to the brackets C, so as to permit the beams to swing vertically. The brackets C, being loosely mounted on the upright arms, permit said beams to swing laterally. As the brackets C are vertically adjustable on the upright arms A A, the forward ends of the beams may be raised or lowered, so as to regulate the depth of plowing.

F F are guide brackets or yokes formed on top of the castings E, and consisting of the upwardly-projecting arms $f\ f$ and straight top portions, $f'\ f'$, forming a guide for the springs, as hereinafter described.

$f^2\ f^2$ are longitudinal slots in the top portions of the bracket.

G G are longitudinally-adjustable ways or tracks secured to the under side of the top portions of the brackets by bolts $g\ g$, passing through the slots $f^2\ f^2$ and bolt-holes $g'\ g'$ in said ways or tracks, said bolts being provided with suitable clamping-nuts, $g^2\ g^2$.

G' $G^2$ are notches in opposite ends of the ways or tracks. Said brackets or yokes are so constructed that the adjustable tracks or ways are located at an angle to the plow-beams and incline upward toward the forward ends of said beams and are at a tangent to circles having the pivotal points or fulcrums of the beams as centers.

To each vertically-adjustable bracket C is secured a double spring, H. This spring consists of a steel rod or wire doubled and having its doubled end secured on a bolt, $h$, projecting from the bracket C a short distance from the doubled end. Each portion of the spring is coiled at $h'\ h'$, the coils being mounted on bearings $h^2$, secured to the upper end of the bracket C. From the coils to the ends of the spring it is bent in the shape of a bow. The free ends are connected by a bolt, I, which passes through the guide bracket or yoke under its straight top portion.

$i$ is a roller mounted on the bolt I, which roller engages with the way or track G. As shown in Fig. 1, when the plow or cultivator beams are down in an operative position, the rollers on the ends of the springs engage with and are held in the notches G' in the forward ends of the ways or tracks. When in this position, the ends of the springs being forced nearer the pivotal points or fulcrums of the beams, their leverage is decreased and they serve to balance said beams and hold them in the desired position for operation. By means of the adjustable tracks or ways and springs the beams, whether carrying heavy or light gangs, can be so accurately and nicely balanced that they can be sustained in a horizontal position and at right angles to the vertical side uprights of the arch or frame, this being accomplished by moving the tracks or ways so as to increase or lessen the leverage of the springs when in engagement with the forward locking-notches of said tracks.

When it is desired to force the beams down, the tracks are moved forward on the yokes or brackets, so as to bring the forward notches nearer the pivotal points of the beams and decrease their leverage sufficiently to permit the rear ends of said beams to drop below the horizontal line. The plows or cultivator-shovels will then be forced into the ground. It will thus be seen that the tracks can be adjusted so as to cause the springs to hold the gangs up in loose soil or force them down in hard ground. In whatever position the tracks are adjusted on the yokes or brackets, a limited vertical movement is permitted the beams without releasing the rollers on springs from the locking-notches, so as to accommodate the gangs to the inequalities of the ground or to allow them to be forced down when passing a dead-furrow. The beams can also be adjusted to hold the gangs down to their work without the assistance of the operator.

When it is desired to lift the beams to an inoperative position, the operator raises the same until the rollers are free from the notches G'. The ends of the springs moving on the arc of a circle having their bearings as a center, the rollers travel back on the tracks or ways and raise the beams, the leverage increasing as said springs expand, and when the rollers engage with the rear locking-notches, $G^2$, they hold the beams elevated without the use of hooks or other devices. For convenience, however, I provide the rear end of the tongue with hooks $b^2\ b^2$ and the beams with rings $b^3\ b^3$, so that said beams may be hooked up in case the springs should break or get out of order.

K is a cross-bar secured to the tongue in front of the cross-bar B. Said cross-bar is connected to the lower ends of the upright arms A A by braces K' K'.

L is a doubletree secured to the tongue, to the ends of which are secured pendent arms L' L', to which the singletrees are secured.

M M are loops on the lower ends of the arms L' L'. To these loops are secured the forward ends of draft-rods $L^2\ L^2$, the rear ends of which are secured in eyes $l\ l$, formed in the collars C' C'. By means of this construction I secure a direct draft from the ends of the plow-beams.

Having thus fully described my invention, I claim as new and desire to secure by Letters Patent—

1. In a wheel-cultivator, the round cross-bar B, rigidly secured to the tongue B', the round upright arms A A, carrying the wheels and provided with sleeve-couplings A' A', adjustably mounted on the bar B and having set-screws $a^2\ a^2$, in combination with the vertically-adjustable brackets C C, loosely mounted and swinging laterally on the arms A A, and the spring H, engaging and traveling on the guide-brackets F, secured to the vertically-swinging plow or cultivator beams pivotally secured to said brackets C C, all constructed, arranged, and operating substantially as shown and described.

2. In a cultivator, and in combination with the supporting-frame, the vertically-adjustable bracket secured thereto, and the plow or cultivator beam pivotally attached to said bracket and movable therewith, an elastic supporting mechanism for the beam, consisting of a spring engaging and traveling on a track or way, substantially as described, said elastic supporting mechanism being interposed between the adjustable bracket and beam and connected to both, whereby the bracket can be raised or lowered on the supporting-frame to adjust the position of the plow or cultivator beam without disturbing or otherwise affecting the action of the supporting mechanism, substantially as set forth.

3. In a cultivator, a suitable supporting-frame and a vertically-adjustable bracket mounted thereon, in combination with a plow or cultivator beam pivotally secured to the adjustable bracket, a track or way on the beam, and a spring secured at one end to the adjustable bracket and movable therewith and having its free end engaging with and traveling on the track or way on the beam, all constructed, arranged, and operating substantially as shown and described, whereby the bracket can be raised or lowered on the frame to adjust the position of the plow or cultivator beams without affecting the tension of the spring.

4. In a cultivator, a supporting-bracket mounted on a suitable frame, a vertically-swinging plow or cultivator beam pivotally secured to said bracket and an adjustable track on the forward end of the beam, and provided with locking-notches in its opposite ends, in combination with a spring secured at one end to the supporting-bracket and having its free end engaging with and traveling on the track or way, all constructed, arranged, and operating substantially as shown and described.

5. In an arched cultivator, a cross-bar rigidly secured to a tongue, upright arms carrying the wheels and provided with sleeve-couplings on their upper ends adjustably mounted on the cross-bar, and supporting-brackets adjustably mounted and swinging laterally on said upright arms, in combination with the vertically-swinging plow or cultivator beams pivotally secured to the supporting-brackets, tracks or ways secured to the plow or cultivator beams, and springs secured at one end to the supporting-brackets and having their free ends engaging with and traveling on the tracks or ways on the beams, all constructed, arranged, and operating substantially as described.

6. In a cultivator, the supporting-bracket C, adjustably mounted on the frame, the vertically-swinging plow or cultivator beam D, pivotally secured to said bracket C, the bracket or yoke F, located on the forward end of the beam, and adjustable track or way G, secured to the bracket or yoke F, in combination with the spring H, secured at one end to the supporting-bracket C and having its free end engaging with the track or way G, all constructed, arranged, and operating substantially as shown and described.

7. In a cultivator, the supporting-bracket C, mounted on the frame, the vertically-swinging plow or cultivator beam D, pivotally secured to said bracket C, the bracket or yoke F, located on the forward end of the beam, and the adjustable track or way G, secured to said bracket or yoke F, and having the locking-notches $G'$ $G^2$ in its opposite ends, in combination with the spring H, secured at one end to the supporting-bracket and provided with a roller, $i$, on its free end, which engages with the track or way G, all constructed, arranged, and operating substantially as shown and described.

8. In an arched cultivator, a cross-bar rigidly secured to a tongue, upright arms carrying the wheels and provided with sleeve-couplings on their upper ends adjustably mounted on the cross-bar, supporting-brackets adjustably mounted and swinging laterally on said upright arms, and vertically-swinging plow or cultivator beams pivotally secured to the supporting-arms and having tracks or ways secured to their forward ends, in combination with springs secured at one end to the supporting-brackets and having their free ends engaging with the tracks or ways on the beams, all constructed, arranged, and operating substantially as shown and described.

In testimony whereof I affix my signature in presence of two witnesses.

WILLIAM L. CASADAY.

Witnesses:
A. H. REMINGTON,
CHAS. L. ZIGLER.